United States Patent Office 2,976,162
Patented Mar. 21, 1961

2,976,162
BRIQUETTING GRANULAR MATERIAL
Wendell G. Ekdahl, North Plainfield, N.J., assignor to Johns-Manville Corporation, New York, N.Y., a corporation of New York
No Drawing. Filed July 3, 1958, Ser. No. 746,316
21 Claims. (Cl. 106—71)

This invention relates to the formation of briquets, and more particularly to the formation of briquets of granular or powdered materials to be used for melting-furnace charges or furnishes such as those employed in the manufacture of mineral fibers. This application is a continuation-in-part of my copending United States patent application Serial No. 401,369, filed December 30, 1953, now abandoned.

Furnace operations, such as in the manufacture of glass and mineral fibers from glass and similar mineral compositions, frequently entail charging a melting furnace with a furnish of materials in the form of particles having an average diameter ranging from approximately ½ to 4 inches. To obtain a molten mass in conventional updraft furnaces, such as a melting cupola, such relatively large size particles are required to provide a path for flow of combustion gases through the charge. It is apparent that a large bulk of finely divided particles cannot be successfully used in such a melting operation, since they either clog the paths of gas flow or are transported out of the melt cupola due to the velocity of the gases. In many instances, however, it is extremely desirable to be able to charge a melting furnace with materials which occur in finely divided form. Moreover, it is often desirable to add to a mineral melt certain finely divided chemical agents which will serve to modify the characteristics of the resultant composition. Additionally, in the formation of mineral fibers, a substantial weight proportion of the molten charge is not obtained in the form of fiber but rather in the form of mineral particles often attached to the fiber and defined in the industry as "shot." It is of great commercial advantage to be able to remelt and reuse these shot particles, since they are of a mineral composition suitable for fiberization without modification, and their discard entails a substantial loss of starting ingredients.

Efforts have been made to solve these problems inherent in attempts to use finely divided particles, such as shot, modifying chemicals, slag or mineral fines, etc. These attempts have often lead to the formation of briquets of such particles, since the formation of briquets of substantial diameter should prevent clogging of the melting cupola or loss of the charge by transportation out of the furnace by combustion gases. Such attempts at briquetting have not been commercially satisfactory, however, for various reasons. The primary difficulty in successfully briquetting such materials has been in the relatively high cost of the briquet binder as compared to the value of the particles to be bonded. It is apparent that high cost binders cannot be successfully employed to bond furnish materials such as slag fines, limestone particles, shot, and other similar low value furnish ingredients. Also, due to a cost consideration, a successful briquet binder cannot require preliminary processing, such as cooking, fluidization, etc., and should not require treatment of the briquet, such as drying, coking, curing, etc., to provide it with adequate strength.

Additionally, it is important that the binder used in briquetting for the purposes herein defined not significantly alter the chemical composition of the glass or mineral fiber product and not contribute thereto any substantial proportion of undesirable ingredients, such as $Na_2O$, sulfur, etc. Furthermore, in order to be satisfactory for the defined purposes, the formed briquet must have sufficient strength and abrasion resistance immediately upon removal from the briquetting press to permit substantial amounts of handling without disintegration. When charged to the furnace, the briquet should sinter at moderately low temperatures to provide satisfactory mechanical strength in the cupola and should be capable of withstanding thermal shock, substantially immediately after pressing, up to temperatures as high as 1800° F. without disintegrating into small fragments.

Accordingly, it is an object of this invention to provide a method of briquetting finely divided particles of furnish ingredients to enable their use in a melting furnace.

Another object of this invention is to provide a briquet binder for finely divided materials which renders their use in a furnish economically possible.

It is a further object of this invention to provide a briquet binder which will not substantially alter the chemical composition of the mineral product obtained from the melt.

It is an additional and more specific object of this invention to provide a method of manufacturing a briquet of finely divided furnish ingredients and a briquet binder which imparts sufficient strength and thermal resistance to prevent its disintegration into small fragments during handling and exposure to heat in the melting furnace.

With the above and other objects and features in view, the invention comprises an improved binder, method of briquetting and product thereof hereinafter described and more particularly defined in the appended claims.

This invention may be employed to briquet any finely divided materials which are desired to be added to a melting furnace charge to obtain a product such as a mineral composition which may be molded to form glass products or may be fiberized to form glass or mineral fiber products. In the formation of such glasses and mineral fibers, conventional furnish ingredients comprise minerals from various sources, such as clays, metallurgical slags, naturally occurring rocks, etc.; and, possibly, relatively small amounts of materials employed to modify the characteristics of products obtained from the molten mass, for example, relatively pure oxides of aluminum, titanium, magnesium, calcium, etc., as well as modifying chemicals such as borax, calcium phosphate, etc., if modification of the furnish ingredients is desired or necessary.

The invention is particularly adapted to briquetting fines of minerals, granular materials or chemicals in finely divided form, and shot particles obtained during fiberization of a molten mass. In the preferred embodiment of the invention, mixtures of shot particles and other mineral fines are bonded into briquet form. In such briquets, the shot can comprise not more than approximately 65% by weight of the ingredients to be bonded. This is due to the fact that shot particles are not completely particulate but have attached to them some fiber. If all the material to be bonded were to comprise shot, the associated fiber would cause sponginess in the briquet and prevent compression of the composition to a sufficient degree to obtain the necessary strength characteristics.

A briquet formed in accordance with this invention will generally comprise a compressed mass of up to approximately 80–95% by weight of finely divided furnish ingredients, approximately ½ to 6% by weight of a hereinafter defined clay, and approximately 2 to 6% by weight of gelatinized starch, together with a total moisture content when formed of approximately 3 to 8% by weight. Only when the briquet is formed with these relative proportions of defined specific ingredients are the advantages of this invention obtained.

The specific type of clay mineral necessary for use in this invention essentially comprises a mixture of approximately 75 to 95% by weight of a non-swelling clay mineral and approximately 5 to 25% by weight of a swellable clay mineral of fine particle size. Exemplary of such non-swelling clay minerals are moderate particle size clays of the kaolinite clay group such as kaolinite, endellite, etc.; clays of the micaceous clay group such as attapulgite, etc.; and other equivalent clay minerals. Exemplary of the swellable minerals of fine particle size are swelling colloidal clay minerals which can expand along the C crystal axis without altering the other two major crystal axes (A or B), such as montmorillonite or bentonite, hectorite, beidellite, etc. The clay may comprise a prepared mixture of such minerals in the indicated range of proportions or may comprise a natural mixture of such minerals. Exemplary of such a natural mineral mixture, and the preferred bonding clay for use in accordance with this invention, is a natural ball clay mined at Crenshaw, Mississippi and known as Mississippi M & D clay. This clay essentially comprises a mixture of approximately 80% kaolinite and approximately 20% montmorillonite.

It is essential that the starch employed in the briquet composition be a gelatinized starch, and it is preferred that it be one obtained from a degermed and dehusked grain. Gelatinized starches or cold water soluble starches are often commercially referred to as cold water paste starch, starch flour, etc. Obviously, the starch may be secured in the non-gelatinized state and gelatinized by the conventional heating in water to temperatures of about 60–80° C. and/or the typical chemical treatments of the industry immediately prior to adding to the briquet composition if desired. A typical and convenient starch is Illinois Cereal Mills' Ceredex, a pregelatinized starch made entirely from corn and processed without any chemicals or additives.

The required moisture content in the briquet of approximately 3 to 8% by weight thereof is primarily resultant from water added to the briquet composition during mixing, but a substantial proportion thereof may result from the moisture content of the ingredients to be bonded.

Any suitable procedure may be employed to obtain a thorough mixing of the briquet composition, and the briquet may be formed on any suitable type of briquet press. It is preferred that the ingredients to be bonded, the clay, and the gelatinized starch be mixed dry until a homogeneous blending of ingredients is obtained, water added to the mixture to bring the moisture content within the range of 3 to 8% by weight and mixing continued until the resulting mass develops a uniform degree of tack. The briquets may be formed with any typical briquetting press and in any suitable shape, for example, in a cylindrical mold on a hydraulic press to a dimension of approximately 2" in diameter and height. Consolidating presures should range from approximately 4000 to 8000 p.s.i., preferably about 5000 p.s.i.

The following are examples of suitable briquets and their general method of preparation. It is understood, of course, that the glass and iron ore compositions or formulations are not a part of this invention and that the particular briquet formulations and method recited are exemplary and not to be considered to limit the invention to the particular composition and proportions outlined. All percentages indicated in the example are by weight.

Example I

A mineral fiber furnish briquet was formed by dry mixing:

| | Percent |
|---|---|
| Glass furnish (equal parts by weight of metallurgical slag fines and shot particles) | 94 |
| M & D ball clay | 3 |
| Gelatinized corn starch | 3 | until a substantially homogeneous blending of all ingredients was obtained. Sufficient water was then added while continuing mixing until a moisture content of approximately 4% was obtained in the composition. A portion of the mixture was then charged to a cylindrical mold on a hydraulic press and molded with a pressure of approximately 6000 p.s.i. Upon removal from the mold, the briquet exhibited excellent abrasion resistance, a compression strength of approximately 800 p.s.i., an impact strength sufficient to withstand at least 5 drops onto a concrete floor from a height of 10 feet, did not disintegrate due to thermal shock when charged to the melting furnace, and exhibited resistance to powdering when melting, thereby preserving air permeability of the furnish bed.

Example II

The foregoing procedure was also utilized to prepare a metallurgical furnish briquet of the following ingredients:

| | Percent |
|---|---|
| Taconite (iron ore) fines (sized up to ¼ in. mesh) | 94 |
| M & D ball clay | 3 |
| Gelatinized (cold water paste) starch | 3 |

Approximately 4% of water was combined to the mixed ingredients and a briquet was formed as described above.

Example III

Another exemplary glass furnish briquet was prepared by combining and mixing the following:

| | Percent |
|---|---|
| Metallurgical slag | 92 |
| Clay (a mixture of approx. 80% kaolinite and approx. 20% montmorillonite) | 4 |
| Gelatinized (cold water paste) starch | 4 |

Approximately 5% of water was added to the foregoing mixed ingredients and a briquet was formed under 5000 p.s.i.

Briquets formed in accordance with this invention were tested by various procedures designed to be as realistic as possible in duplicating the treatment, both in degree and repetition of abuse, to which the briquets would be subjected subsequent to pressing. The mechanical resistance of such briquets was tested by dropping a briquet from a height of 10 feet onto a concrete floor. The drops were repeated until the briquet fractured or disintegrated into small fragments. A minimum of 5 drops before fracture or disintegration is required for acceptability in judging the necessary strength of the product. Resistance to disintegration due to thermal shock was tested by introducing a briquet into a furnace held at a minimum of approximately 1800° F. immediately after the briquet was pressed and was in its wettest condition. Disintegration into small fragments renders the briquet unacceptable and, in fact, cracking or fracture into more than two or three pieces is undesirable. The briquets were tested for compression strength by applying to them a constant rate of pressure application of 4000 p.s.i./min. on a 60,000 pound press. For satisfactory service, the briquet should resist a pressure of approximately 500 p.s.i. when wet.

It will be understood that the details given herein are for the purpose of illustration, not restriction, and that variations within the spirit of the invention are intended to be included in the scope of the appended claims.

What I claim is:

1. A briquet for use in charging finely divided mineral furnish ingredients to a melting furnace consisting essentially of a compressed mass of approximately 80 to 95% by weight of finely divided mineral furnish ingredients and a binder, said binder consisting essentially of approximately ½ to 6% by weight of a mixture of approximately 75 to 95% by weight of a non-swelling clay mineral and approximately 5 to 25% by weight of a swellable clay mineral of fine particle size, and approximately 2 to 6% by weight of gelatinized starch, together with a total moisture content when formed of approximately 3 to 8% by weight.

2. A briquet for use in charging finely divided mineral furnish ingredients to a melting furnace consisting essentially of a compressed mass of approximately 80 to 95% by weight of finely divided mineral furnish ingredients and a binder, said binder consisting essentially of approximately ½ to 6% by weight of a mixture of approximately 75 to 95% by weight of a non-swelling clay mineral selected from the group consisting of the kaolinite clay group and the micaceous clay group and approximately 5 to 25% by weight of a swellable clay mineral of fine particle size selected from the group consisting of montmorillonite, hectorite and beidellite, and approximately 2 to 6% by weight of gelatinized starch, together with a total moisture content when formed of approximately 3 to 8% by weight.

3. A briquet for use in charging finely divided mineral furnish ingredients to a melting furnace consisting essentially of a compressed mass of approximately 80 to 95% by weight of finely divided mineral furnish ingredients and a binder, said binder consisting essentially of approximately ½ to 6% by weight of a clay having the clay characteristics of Mississippi M & D clay, and approximately 2 to 6% by weight of gelatinized starch, together with a total moisture content when formed of approximately 3 to 8% by weight.

4. A briquet for use in charging finely divided mineral fiber furnish ingredients to a melting furnace consisting essentially of a compressed mass of approximately 80 to 95% by weight of finely divided mineral fiber furnish ingredients, including up to approximately 65% by weight thereof of shot particles, and a binder, said binder consisting essentially of approximately ½ to 6% by weight of a mixture of approximately 75 to 95% by weight of a non-swelling clay mineral and approximately 5 to 25% by weight of a swellable clay mineral of fine particle size, and approximately 2 to 6% by weight of gelatinized starch, together with a total moisture content when formed of approximately 3 to 8% by weight.

5. A briquet for use in charging finely divided mineral fiber furnish ingredients to a melting furnace consisting essentially of a compressed mass of approximately 80 to 95% by weight of finely divided mineral fiber furnish ingredients, including up to approximately 65% by weight thereof of shot particles, and a binder, said binder consisting essentially of approximately ½ to 6% by weight of a mixture of approximately 75 to 95% by weight of a non-swelling clay mineral selected from the group consisting of the kaolinite clay group and the micaceous clay group and approximately 5 to 25% by weight of a swellable clay mineral of fine particle size selected from the group consisting of montmorillonite, hectorite and beidellite, and approximately 2 to 6% by weight of gelatinized starch, together with a total moisture content when formed of approximately 3 to 8% by weight.

6. A briquet for use in charging finely divided mineral fiber furnish ingredients to a melting furnace consisting essentially of a compressed mass of approximately 80 to 95% by weight of finely divided mineral fiber furnish ingredients, including up to approximately 65% by weight thereof of shot particles, and a binder, said binder consisting essentially of approximately ½ to 6% by weight of a clay having the clay characteristics of Mississippi M & D clay, and approximately 2 to 6% by weight of gelatinized starch, together with a total moisture content when formed of approximately 3 to 8% by weight.

7. A briquet for use in charging finely divided mineral fiber furnish ingredients to a melting furnace consisting essentially of a compressed mass of approximately 80 to 95% by weight of finely divided mineral fiber furnish ingredients, approximately ½ to 6% by weight of a mixture of approximately 75 to 95% by weight of a non-swelling clay mineral and approximately 5 to 25% by weight of a swellable clay mineral of fine particle size, and approximately 2 to 6% by weight of gelatinized starch, together with a total moisture content when formed of approximately 3 to 8% by weight.

8. A method of briquetting finely divided mineral furnish ingredients which comprises mixing the finely divided mineral furnish ingredients with approximately ½ to 6% by weight of the total mass of a mixture of approximately 75 to 95% by weight of a non-swelling clay mineral and approximately 5 to 25% by weight of a swellable clay mineral, and approximately 2 to 6% by weight of the total mass of gelatinized starch, adjusting the total moisture content of the mixture to approximately 3 to 8% by weight and consolidating the same.

9. A method of briquetting finely divided mineral furnish ingredients which comprises mixing finely divided mineral furnish ingredients with approximately ½ to 6% by weight of the total mass of a clay having the clay characteristics of Mississippi M & D clay, and approximately 2 to 6% by weight of the total mass of gelatinized starch, adjusting the total moisture content of the mixture to approximately 3 to 8% by weight and consolidating the same.

10. A method of briquetting finely divided mineral furnish ingredients which comprises mixing finely divided mineral furnish ingredients with approximately ½ to 6% by weight of the total mass of a mixture consisting of approximately 75 to 95% by weight of a non-swelling clay mineral selected from the group consisting of the kaolinite clay group and the micaceous clay group and approximately 5 to 25% by weight of a swellable clay mineral of fine particle size selected from the group consisting of montmorillonite, hectorite and beidellite, and approximately 2 to 6% by weight of the total mass of gelatinized starch, adjusting the total moisture content of the mixture to approximately 3 to 8% by weight and consolidating the same.

11. A method of briquetting finely divided mineral furnish ingredients which comprises mixing finely divided mineral furnish ingredients with approximately ½ to 6% by weight of the total mass of a mixture of approximately 75 to 95% by weight of a non-swelling kaolinite clay mineral and approximately 5 to 25% by weight of the mass of a swellable montmorillonite clay mineral, and approximately 2 to 6% by weight of the total of gelatinized starch, adjusting the total moisture content of the mixture to approximately 3 to 8% by weight and consolidating the same.

12. A method of briquetting finely divided mineral furnish ingredients which comprises mixing the finely divided mineral furnish ingredients with approximately ½ to 6% by weight of the total mass of Mississippi M & D clay, and approximately 2 to 6% by weight of the total mass of gelatinized starch, adjusting the total moisture content of the mixture to approximately 3 to 8% by weight and consolidating the same.

13. A briquet for use in charging finely divided mineral fiber furnish ingredients to a melting furnace which consists essentially of a compressed mass of finely divided mineral fiber furnish ingredients and a binder, said binder consisting essentially of approximately ½ to 6% by weight of the briquet of a mixture of approximately 75 to 95% by weight of a non-swelling clay mineral and approximately 5 to 25% by weight of a swellable clay mineral, and approximately 2 to 6% by weight of a gelatinized starch, together with a total briquet moisture content when formed of approximately 3 to 8% by weight of the briquet.

14. A briquet for use in charging finely divided mineral fiber furnish ingredients to a melting furnace which consists essentially of a compressed mass of finely divided mineral fiber furnish ingredients and a binder, said binder consists essentially of approximately ½ to 6% by weight of the briquet of Mississippi M & D clay, and approximately 2 to 6% by weight of gelatinized starch, together with a total briquet moisture content when formed of approximately 3 to 8% by weight of the briquet.

15. A briquet for use in charging finely divided mineral fiber furnish ingredients to a melting furnace which consists essentially of a compressed mass of finely divided mineral fiber furnish ingredients and a binder, said binder consisting essentially of approximately ½ to 6% by weight of the briquet of a mixture of approximately 75 to 95% by weight of a non-swelling clay mineral selected from the group consisting of the kaolinite clay group and the micaceous clay group and approximately 5 to 25% by weight of a swellable clay mineral of fine particle size selected from the group consisting of montmorillonite, hectorite and beidellite, and approximately 2 to 6% by weight of gelatinized starch, together with a total briquet moisture content when formed of approximately 3 to 8% by weight of the briquet.

16. A binder for briquetting finely divided mineral fiber furnish ingredients which consists essentially of approximately ½ to 6 percent by weight of the briquet furnish of a mixture of approximately 75 to 95% by weight of a non-swelling clay mineral and approximately 5 to 25% by weight of a swellable clay mineral of fine particle size, and approximately 2 to 6 parts by weight of gelatinized starch, together with a total moisture content of approximately 3 to 8% by weight of the briquet.

17. A binder for briquetting finely divided mineral fiber furnish ingredients which consists essentially of approximately ½ to 6 percent by weight of the briquet furnish of a mixture of approximately 75 to 95% by weight of a non-swelling clay mineral selected from the group consisting of the kaolinite clay group and the micaceous clay group and approximately 5 to 25% by weight of a swellable clay mineral of fine particle size selected from the group consisting of montmorillonite, hectorite, and beidellite, and approximately 2 to 6 parts by weight of gelatinized starch, together with a total moisture content of approximately 3 to 8% by weight of the briquet.

18. A binder for briquetting finely divided mineral fiber furnish ingredients which consists essentially of approximately ½ to 6 percent by weight of the briquet furnish of a clay having the clay characteristics of Mississippi M & D clay, and approximately 2 to 6 parts by weight of gelatinized starch, together with a total moisture content of approximately 3 to 8% by weight of the briquet.

19. The method of charging finely divided mineral fiber furnish ingredients to a melting cupola which comprises mixing 80 to 95 percent by weight of finely divided mineral fiber furnish ingredients with a binder consisting essentially of approximately ½ to 6 parts by weight of a mixture of approximately 75 to 95% by weight of a non-swelling clay mineral and approximately 5 to 25% by weight of a swellable clay mineral of fine particle size, and approximately 2 to 6 parts by weight of gelatinized starch, adjusting the total moisture content of the mixture to approximately 3 to 8% by weight, consolidating the mixture to form briquets, and feeding the same to a melting cupola.

20. A method of charging finely divided mineral fiber furnish ingredients to a melting cupola which comprises mixing 80 to 95 percent by weight of finely divided mineral fiber furnish ingredients with a binder consisting essentially of approximately ½ to 6 parts by weight of a clay having the clay characteristics of Mississippi M & D clay, and approximately 2 to 6 parts by weight of gelatinized starch, adjusting the total moisture content of the mixture to approximately 3 to 8% by weight, consolidating the mixture to form briquets, and feeding the same to a melting cupola.

21. A method of charging finely divided mineral fiber furnish ingredients to a melting cupola which comprises mixing 80 to 95 percent by weight of finely divided mineral fiber furnish ingredients with a binder consisting essentially of approximately ½ to 6 parts by weight of a combination of clays consisting of approximately 75 to 95% by weight of a non-swelling clay mineral selected from the group consisting of the kaolinite clay group and the micaceous clay group and approximately 5 to 25% by weight of a swellable clay mineral of fine particle size selected from the group consisting of montmorillonite, hectorite and beidellite, and approximately 2 to 6 parts by weight of gelatinized starch, adjusting the total moisture content of the mixture to approximately 3 to 8% by weight, consolidating the mixture to form briquets, and feeding the same to a melting cupola.

References Cited in the file of this patent

UNITED STATES PATENTS

| | | |
|---|---|---|
| 1,421,192 | Elsenbast et al. | June 27, 1922 |
| 1,498,269 | Harris | June 17, 1924 |
| 2,020,403 | Engle | Nov. 12, 1935 |
| 2,884,380 | Cook et al. | Apr. 28, 1959 |